UNITED STATES PATENT OFFICE.

JOHN J. ANGUS, OF GREENBUSH, WISCONSIN.

FOOD COMPOUND.

SPECIFICATION forming part of Letters Patent No. 515,736, dated March 6, 1894.

Application filed June 12, 1893. Serial No. 477,258. (No specimens.)

*To all whom it may concern:*

Be it known that I, JOHN J. ANGUS, of Greenbush, in the county of Sheboygan and State of Wisconsin, have invented certain new and useful Improvements in Food Products; and I do hereby declare that the following is a full, clear, and exact description thereof.

The object of my invention is to increase the wholesome and nutritious product obtained from milk in the manufacture of cheese, which object is attained by combining the completed cheese product, obtained from the milk, with the product obtained by evaporating the whey produced from the milk during the process of manufacturing cheese. The whey product used to be as a paste or a powder.

The cheese and the product obtained by evaporating whey are combined by kneading, working, grinding or pressing; thus producing a palatable, nutritious and wholesome food product containing, in addition to the elements of cheese, all of the milk sugar and other solids of the milk, much increasing the available food product obtained from the milk, and producing a food much more wholesome than cheese alone.

During the process of curing, and after passing the curdy stage there can be thoroughly incorporated with the cheese the whey product by kneading, working, grinding or pressing. Advantage may be taken of the different ages and degrees of ripeness of cheese to obtain the desired flavor in the completed food product.

Having thus described my invention, I claim as new and desire to secure by Letters Patent—

As a new article of manufacture a food product consisting of cheese in its ripened or mellow state having incorporated therewith evaporated whey, substantially as described.

Signed at Greenbush, county of Sheboygan, and State of Wisconsin.

JOHN J. ANGUS.

Witnesses:
ZEVIAH STANNARD,
H. C. WADE.